United States Patent
Djelassi et al.

(10) Patent No.: US 9,887,532 B2
(45) Date of Patent: Feb. 6, 2018

(54) POWER SWITCH DEVICE

(71) Applicant: Infineon Technologies AG, Neubiberg (DE)

(72) Inventors: Christian Djelassi, Villach (AT); Hans-Peter Kreuter, Villach (AT); Robert Illing, Finkenstein (AT); Alexander Mayer, Treffen (AT); Luca Petruzzi, Goedersdorf (AT); Bernhard Auer, Millstatt (AT); Markus Ladurner, Villach (AT); Alberto Zanardi, Villach (AT)

(73) Assignee: Infineon Technologies AG, Neubiberg (DE)

( * ) Notice: Subject to any disclaimer, the term of this patent is extended or adjusted under 35 U.S.C. 154(b) by 200 days.

(21) Appl. No.: 14/597,077

(22) Filed: Jan. 14, 2015

(65) Prior Publication Data

US 2016/0204593 A1    Jul. 14, 2016

(51) Int. Cl.
  *H02H 3/08*    (2006.01)
  *H02H 3/087*    (2006.01)
  *H02H 3/07*    (2006.01)

(52) U.S. Cl.
  CPC ............. *H02H 3/08* (2013.01); *H02H 3/07* (2013.01)

(58) Field of Classification Search
  CPC ............ H01H 75/04; H02H 3/06; H02H 3/08; H02H 3/087; H02H 9/025
  USPC ........................................................ 361/101
  See application file for complete search history.

(56) References Cited

U.S. PATENT DOCUMENTS

| | | | | |
|---|---|---|---|---|
| 5,418,674 | A | * | 5/1995 | Davies ............. H03K 17/04213 361/18 |
| 2002/0106945 | A1 | * | 8/2002 | Wyatt ................... F04B 49/065 439/894 |
| 2009/0080130 | A1 | | 3/2009 | Hein |
| 2012/0014025 | A1 | | 1/2012 | Sato et al. |
| 2012/0113555 | A1 | * | 5/2012 | Mousavi ................ H02H 3/066 361/78 |

FOREIGN PATENT DOCUMENTS

DE    102008026737 A1    4/2009
EP    1241778 A2    9/2002

OTHER PUBLICATIONS

Nelhiebel, M. et al., "A reliable technology concept for active power cycling to extreme temperatures," ESREF 2011: 22nd European Symposium on Reliability of Electron Devices, Failure Physics and Analysis, Oct. 3-7, 2011, 4 pp.
"VIPower™ M0-7 Miniaturized high-side driver family," STMicroelectronics, Apr. 2014, 8 pp.
"Profet™ + Current Sense, What the designer should know," Infineon Technologies AG, Application Note, Rev. 1.1, Mar. 14, 2014, 34 pp.

* cited by examiner

*Primary Examiner* — Dharti Patel
(74) *Attorney, Agent, or Firm* — Shumaker & Sieffert, P.A.

(57) ABSTRACT

Devices and methods comprising a switch and an overload detection are disclosed. When an overload detection is detected, a first retry scheme followed by a second retry scheme different from the first retry scheme may be applied. If the overload condition persists, the switch may be disabled.

19 Claims, 19 Drawing Sheets

POWER SWITCH DEVICE

TECHNICAL FIELD

The present application relates to power switch devices and to corresponding methods

BACKGROUND

Power switches are conventionally used to couple a load with a supply voltage. In recent years, "smart" power switch devices have been developed which are equipped with one or more diagnostic abilities and protection features, for example against overload and short circuit events. For example, in such power switch devices as a power switch a MOS transistor may be used, and the switch may be opened (i.e. caused to be non-conducting between terminals of the switch) in case of overload or short circuit events.

In some applications, after a switch has been opened for example due to an overload or short circuit event, a retry is required, i.e. the switch closes again. For example, in some automotive applications a light bulb may be coupled to a power switch device. As long as a filament of the light bulb is cold, a resistance of the filament is very low, which resembles a short circuit. In this case, the power switch device may open and then close again for a retry e.g. after some predetermined time. In some applications, with each retry the filament may be heated more until its resistance is sufficiently high to keep the switch closed. However, in case of for example a real short circuit in some implementations of power switch devices retries may be made a plurality of times (or even for an essentially indefinite number of times), which causes a high repetitive stress to the power switch device, which may eventually lead to failures of the power switch device.

DETAILED DESCRIPTION

Figure 1:
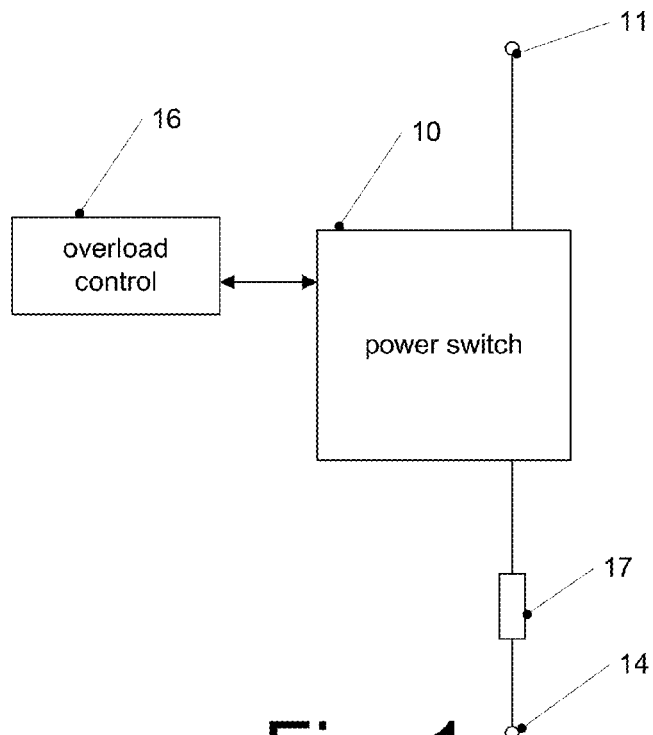
FIG. 1 is a schematic diagram of a power switch device according to an embodiment.

In the following, various embodiments will be described in detail with reference to the attached drawings. It is to be noted that these embodiments serve as illustrative examples only and are not to be construed as limiting the scope of the present application. For example, while an embodiment may be described as comprising a plurality of features or elements, this serves illustration purposes only, and in other embodiments some of these features or elements may be omitted and/or replaced by alternative features or elements. Furthermore, in some embodiments additional features or elements in addition to those described or shown in the drawings may be provided without departing from the scope of the present application. Also, features or elements from different embodiments may be combined with each other to form further embodiments.

Any connections or couplings, in particular electrical connections or couplings, shown in the drawings or described herein may be implemented as direct connections or couplings, i.e. as connections or couplings without intervening elements, or as indirect connections or couplings, i.e. connections or couplings with one or more intervening elements, as long as the general function of the connection or coupling, for example to transmit a certain kind of information or signal, is essentially maintained. Connections or couplings may be implemented as wire-based connections or couplings or as wireless connections or couplings, or mixtures thereof.

Some embodiments relate to power switches having a shutdown or overload limit, in the following simply referred to as overload limit. When a given quantity, for example a voltage, a current, a temperature or a temperature slope (e.g. dT/dt, T being the temperature and t the time), reaches the overload limit, the power switch is opened, to become essentially non-conducting between terminals.

Generally, in the context of the present application power switches may be described as comprising one or more control terminals and two or more load terminals. An opening and closing of the power switch may be controlled by applying one or more signals to the one or more control terminals. When the power switch is closed, it provides a low-ohmic connection between at least two of its load terminals, such that current may flow between the load terminals. When the switch is opened, the power switch exhibits a blocking behavior between its load terminals, i.e. is high-ohmic, such that essentially no current may flow between the load terminals (with the exception of undesired effects like leakage current etc., which may occur in real devices). The closed state is also referred to as an on-state of the switch, and the open state is also referred to as off-state.

In some embodiments, the power switch may be implemented using a field effect transistor like a MOS transistor. In such a case, the load terminals may correspond to source and drain terminals of the field effect transistor, and the control terminal may correspond to a gate terminal of the field effect transistor.

Besides being opened and closed, in some embodiments the power switch may also be disabled. In a disabled state, the power switch may be set (e.g. latched) to a predetermined state (for example open state, i.e. off), and may not be controlled to be opened or closed by the above-mentioned control signal(s). Instead, before being operable by the control signal(s) again, in embodiments, the power switch has to be reset, for example by applying specific signals or signal sequences to specific terminals of the power switch.

In some embodiments, when the overload limit is reached, a first retry scheme is employed. In the first retry scheme, for example the power switch may be opened upon detection of the overload condition and closed again in first intervals. If the overload condition (i.e. reaching or exceeding the overload limit) persists, a second retry scheme may follow, for example with at least some longer intervals between closing the power switch (e.g. longer intervals between sets of retries) than during the first retry scheme. If the overload condition still persists, the power switch may be disabled. Details and non-limiting examples for such schemes will be discussed further below in more detail. A retry, in this context, may refer to closing the switch again after it has been opened due to an overload condition.

Turning now to the Figures, FIG. 1 shows a schematic block diagram of a power switch device according to an embodiment. The power switch device of FIG. 1 comprises a power switch 10. A first load terminal of power switch 10 is coupled with a first supply voltage 11, for example a positive supply voltage. A second load terminal of power switch 10 is coupled with a load 17, which in turn is coupled with a second supply voltage 14, for example ground or a negative supply voltage.

A control terminal of power switch 10 is coupled to an overload control 16. Overload control 16 may be configured to open power switch 10 under certain conditions, for example when a overload limit is reached regarding for example a voltage drop over the power switch, a current flowing through the power switch, and/or a temperature of the power switch. Other criteria for shutdown, i.e. opening of the power switch, may be used as well.

In some embodiments, overload control 16 may repeatedly close power switch 10 again according to a first retry scheme upon detection of an overload. Retry intervals of the first retry scheme may for example predetermined first retry intervals or may be intervals depending on a temperature of the power switch. In the latter case, for example the power switch is closed again after the temperature has dropped below a predetermined level. Other retry schemes may also be used as first retry schemes. In some embodiments, the first retry scheme may for example take into account the behavior of light bulbs described in the background section, such that finally the light bulb is switched on without causing an overload condition (as for example the filament has heated enough to provide a sufficiently high resistance).

In case the overload condition persists after application of the first retry scheme, for example after a predetermined number of retries has been reached, in some embodiments overload control 16 applies at least a second retry scheme. "At least a second retry scheme" indicates that after the second retry scheme in some embodiments one or more further retry schemes (third, forth etc.) may follow, although this need not be the case. For ease of illustration, in the embodiments described herein only a second retry scheme is discussed in detail. The second retry scheme may involve closing power switch 10 with predetermined intervals between retries or groups of retries. The predetermined intervals may have a time duration longer than intervals between retries during the first retry scheme. For example, the predetermined intervals may be at least two times longer, at least four times longer or more than a longest interval of the intervals of the first retry scheme. Other relationships may also apply.

In case the cause for the overload persists during the second retry scheme (and optional further retry schemes), e.g. after a predetermined number of retries, the power switch may be disabled. In this case, for example only by applying a reset to the power switch, the power switch may be enabled again so it may be closed or opened.

Figure 2:
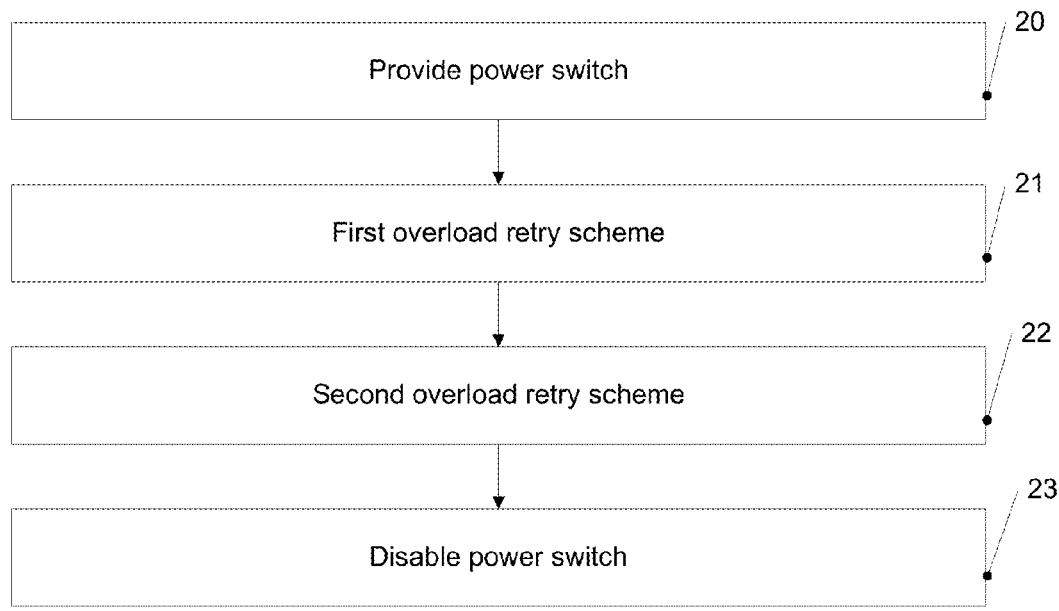
FIG. 2 is a flowchart illustrating a method according to an embodiment.

FIG. 2 shows a flow chart illustrating a method according to an embodiment. The method of FIG. 2 may be implemented using the power switch device illustrated with respect to FIG. 1 or any one of power switch devices illustrated later, but may also be implemented independently therefrom.

At 20, a power switch is provided. At 21, upon detection of an overload (for example overcurrent, overvoltage, overtemperature etc.), a first retry scheme is applied. During the first retry scheme, the power switch may be closed in regular or irregular first intervals and opened again if the overload condition persists for up to a first predetermined number of times. The intervals may for example depend on a temperature of the power switch falling below a predetermined threshold, or may be predetermined intervals.

In some cases, during or after the application of the first overload retry scheme, the power switch may be closed without an overload condition occurring. This may for example happen when switching on a light bulb using the power switch, as explained previously. In other cases, the cause for the overload may remain, such that the overload condition still occurs when closing the power switch. In such a case, in the embodiment of FIG. 2 at 22, after the first retry scheme a second retry scheme is applied. During the second retry scheme, the power switch may be closed and opened again if the overload condition persists or occurs again with second intervals between closings or groups of closings of the switch. The second intervals of the second overload retry scheme may be longer than first intervals of the first overload retry scheme. The second intervals of the second overload retry scheme may be predetermined time intervals. The closing according to the second intervals may be repeated up to a second number of times. Within groups of closings, the switch may be closed in third intervals shorter than the second intervals for up to a third predetermined number of times. If after a predetermined number of retries (closing of the switch) in the second overload retry scheme (i.e. a predetermined number of attempts to close the switch successfully e.g. second predetermined number×third predetermined number), overload still occurs, at 23 the power switch may be disabled. In the disabled state, as explained previously, the power switch may not be opened or closed, but may for example remain opened. To leave the disabled state, for example a reset of the power switch has to be performed, for example by applying one or more predetermined signals or signal sequences to one or more terminals of the power switch.

Next, with reference to FIGS. 3 and 4, some more detailed examples of power switches and power switch devices usable in embodiments, for example to implement the power switch device and power switch illustrated in FIG. 2, will be discussed.

Figure 3:
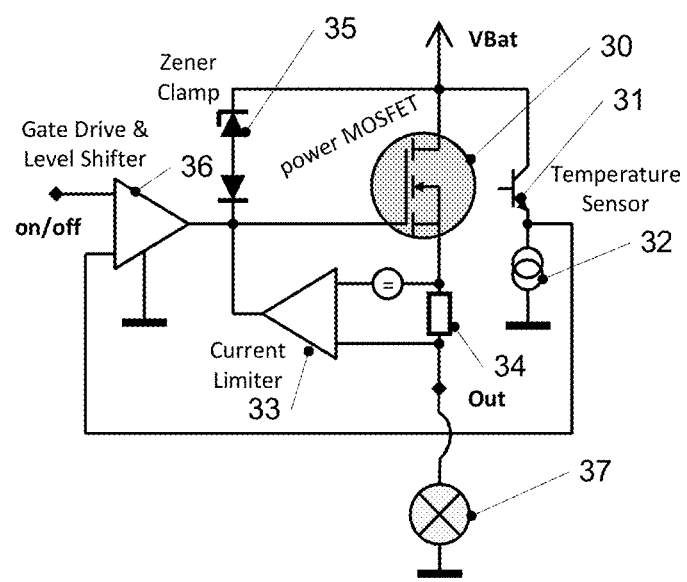
FIG. 3 is a diagram illustrating a power switch device according to some embodiments.

In FIG. 3, a power switch device comprising a power switch and various circuitry associated with the power switch is shown. The power switch device of FIG. 3 may form the basis of various embodiments.

The power switch device of FIG. 3 comprises a MOSFET 30 acting as a power switch to selectively couple a supply voltage, for example a battery voltage VBat, with a load, which load in case of FIG. 3 is represented by a light bulb 37. A gate terminal of power MOSFET 30 is coupled to an output of a gate driver and level shifter 36. Via gate driver and level shifter 36, using an on-off signal the switch may be selectively turned on or off, an "on" state in the context of the present application corresponding to a closed state, and an "off" state corresponding to an open state.

Gate driver and level shifter 36 additionally receives a signal from a temperature sensor, which in the example of FIG. 3 is formed by a transistor 31 and a current source 32. Transistor 31 may be a bipolar transistor, PN junctions of which change their behavior with changing temperature. In other embodiments any other conventional implementation of a temperature sensor may be used.

Furthermore, the power switch device of FIG. 3 comprises a current limiter 33. Current limiter 33 receives a measure of a current flowing via the load terminals of power MOSFET 30 by measuring a voltage drop across a sense resistor 34 and may control the gate terminal of power MOSFET 30 to prevent an overcurrent. Other circuitry may also be provided, for example shunt resistors for current limitation. Furthermore, a Zener diode clamp 35 is provided as an overvoltage protection. It should be noted that the shown power switch devices serve only illustrative purposes, and in other power switch devices, for example only some of the features or elements shown and/or alternative features or elements may be provided. Using the power switch device of FIG. 3, for example the retry schemes as discussed above may be implemented.

Figure 4A:
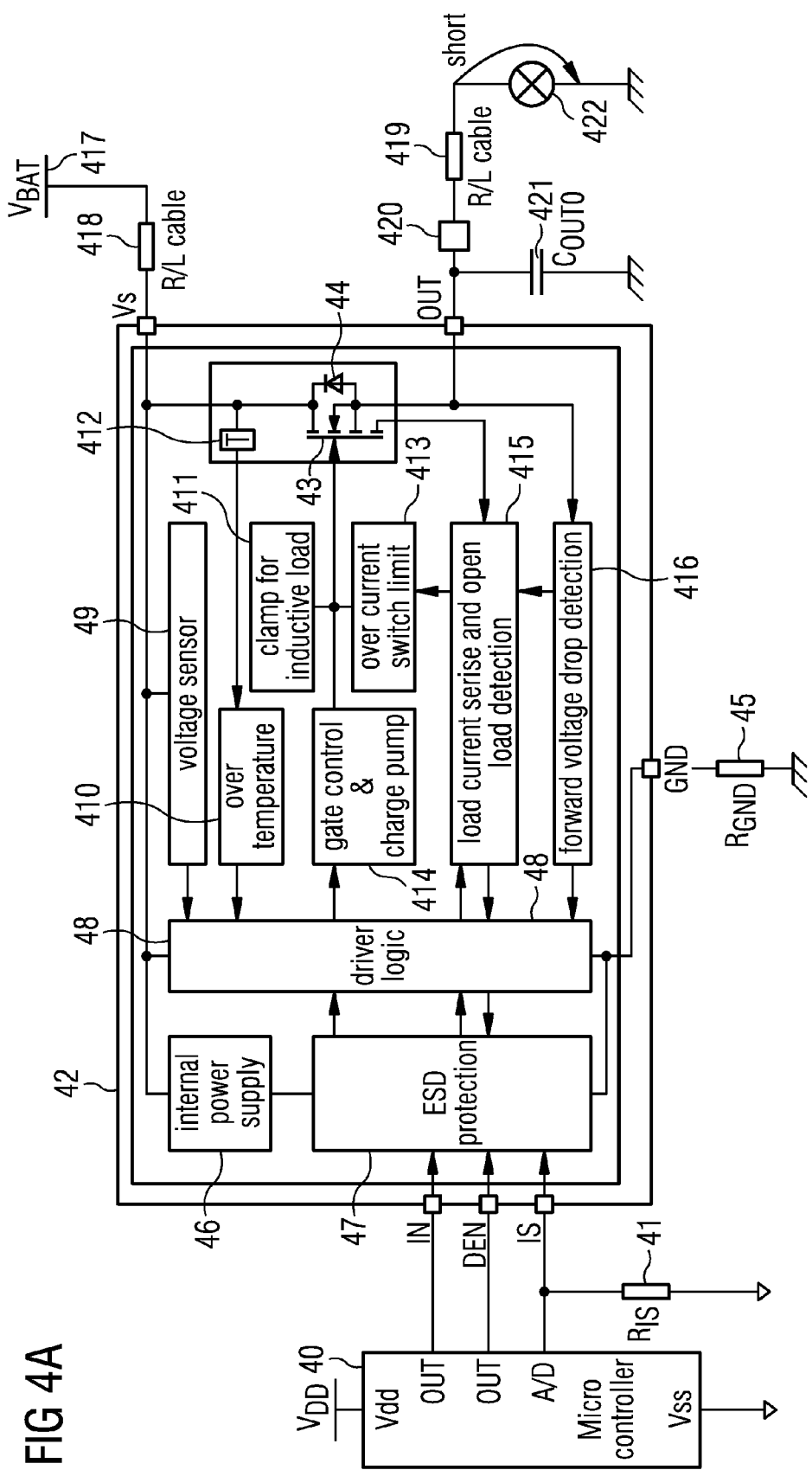
FIG. 4A is a diagram illustrating a power switch device according to some embodiments.

In FIG. 4A, a further example of a power switch device serving as a basis for embodiments is shown together with associated circuitry. In the example of FIG. 4A, a power switch device 42 comprises a power MOSFET 43 as a power switch, which in the example of FIG. 4A serves to couple a supply voltage, for example a battery voltage, 417 with a load 422. In the example of FIG. 4A, the load is represented by a light bulb symbol, although other loads may be used as well.

An impedance, in particular resistance and/or inductivity, of a wiring from supply voltage 417 to a supply voltage input of power switch device 42 is labeled 418 in FIG. 4A, and an impedance, for example resistance and/or inductivity, of a wiring from an output pad 420 of power switch device 42 to load 422 is labeled 419 in FIG. 4. All elements of power switch device 42 in some embodiments may be implemented on a single chip die, although other embodiments may use more than one chip die. Additionally, an output capacitance 421 may be provided, and power switch device 42 may be coupled to ground via a resistor 45 in some embodiments.

Power switch device 42 may be controlled by a microcontroller 40, which may be coupled with power switch device 42 as shown, including a resistor 41 in the coupling. However, this merely serves as an example.

Signals from microcontroller 40 are provided to a driver logic 48 of power switch device 42 via an ESD protection circuitry 47. Driver logic 48 controls a gate control and charge pump 414, which in turn controls a gate terminal of power MOSFET 43.

Furthermore, power switch device 42 in the embodiment shown comprises a temperature sensor 412, for example as shown in FIG. 3, to detect an overtemperature event by an overtemperature detection circuit 410. Overtemperature detection 410 is coupled to driver logic 41 and may for example control driver logic 48 to open power MOSFET 43 in case of an overtemperature being detected.

Furthermore, the power switch 42 of the embodiment of FIG. 4A comprises a load current sense and open load detection circuit 415, which may sense a load current. Depending on the load current, driver logic 48 may be controlled to open or close the switch. Furthermore, an overcurrent switch limit 413 may be set upon reaching of which switch 43 may for example be opened. This function may for example correspond to current limiter 33 of FIG. 4A.

Furthermore, the power switch device of FIG. 4A may comprise a voltage sensor 49 for monitoring supply voltage 417 and controlling driver logic 48 in response thereto, and a forward voltage drop detection 416 to detect a voltage drop across power switch 43 and again to control driver logic 48 in response thereto.

Furthermore, transistor 43 may have a reverse bias diode 44, either in form of a parasitic diode or in form of a deliberately implemented diode, coupled in parallel to its source and drain terminal, which may form a dissipation path in case of shutdowns. For example, in case of a short circuit of load 422 as illustrated by an arrow in FIG. 4A, a high current may be sensed, and overcurrent switch limit 413 may control power switch 413 to open, also referred to as emergency shutdown. In this case, energy stored in inductivities 418, 419 may discharge via diode 44. This in some cases may lead to a comparatively high temperature of power switch 43.

Such short circuits may not only appear due to faulty wiring, faulty loads or other faults, but may also be inherent to certain applications. For example, in case a load like load 47 of FIG. 3 or load 422 of FIG. 4A is a light bulb as illustrated, when first switching on the light bulb, i.e. closing an associated power switch, a filament of the light bulb is still cold. A cold filament of a light bulb typically has a very low resistance, similar to a short circuit. In such a case, power switch 42 may be controlled for example by microcontroller 40 and/or by driver logic 48 to e.g. apply first and second retry schemes as discussed with reference to FIGS. 1 and 2, to repetitively retry switching on the light bulb following an emergency shutdown due to overcurrent, dT (e.g. rapid rise in temperature or other temperature change above a threshold) or overtemperature event. In some cases, with each repetition a filament of the light bulb may be heated more, increasing its resistance, until a stable operation is obtained. In some cases, a number of repetitions or retries necessary until a stable state for such a light bulb is reached may depend on a voltage. For example, in automotive applications a supply voltage may not be very stable, leading to variations.

Figure 4B:
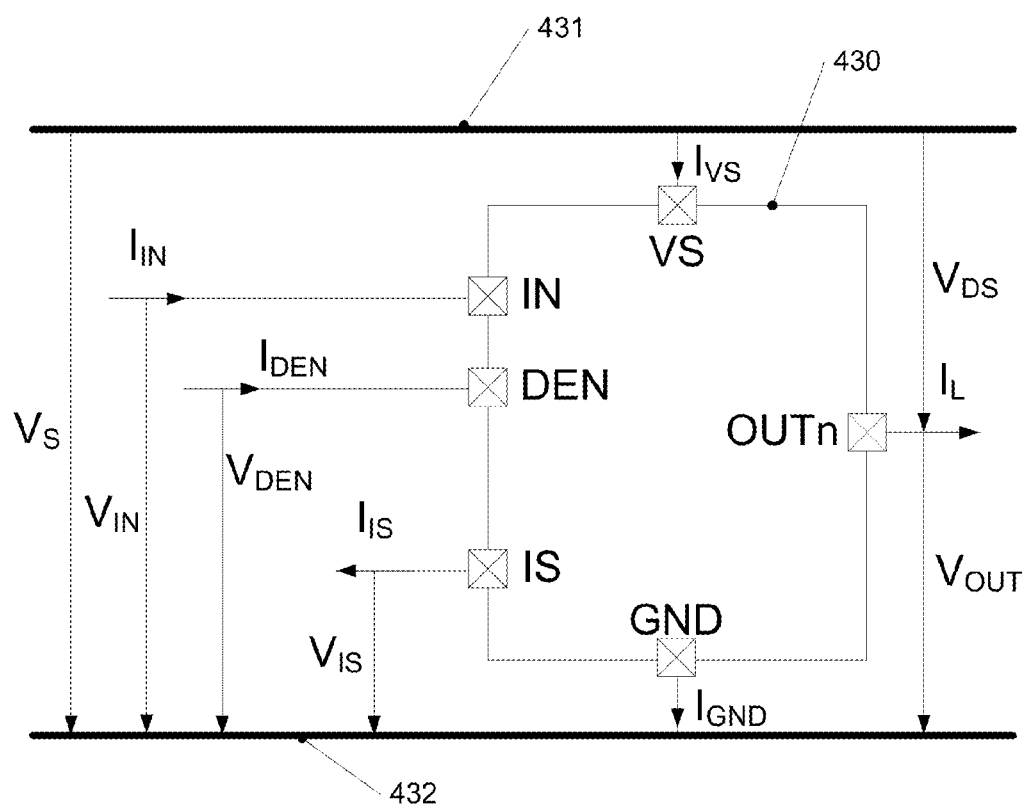
FIG. 4B is a diagram illustrating some quantities used for the illustration of some embodiments.

For later reference, FIG. 4B shows various quantities (voltages and currents) of a power switch device like the power switch device illustrated in FIG. 4A. The voltages and currents illustrated in FIG. 4B will be used in later examples for illustration purposes. In particular, in FIG. 4B 430 denotes a power switch device which may correspond to power switch device 42 of FIG. 4A, but is not limited thereto, 431 denotes a positive supply voltage line and 432 denotes a ground line. IN denotes an input terminal used for switching the power switch device (i.e. opening or closing the power switch device), and OUTn denotes one or more output terminals to which loads may be coupled. VS denotes a terminal to be coupled with positive supply voltage line 431, and GND denotes a terminal to be coupled with ground line 432. DEN denotes a terminal which may be used for diagnosis purposes, in particular to enable a diagnosis state, and IS is an output terminal for reading for example internal states of power switch device 43. As will be explained later, terminal DEN and/or IN may also be used for applying a reset signal, ending for example the above-mentioned disabled state.

When power switch device 430 is closed, in particular terminals VS and OUTn are essentially connected, while when power switch 430 is opened, these terminals are disconnected.

Figure 5:
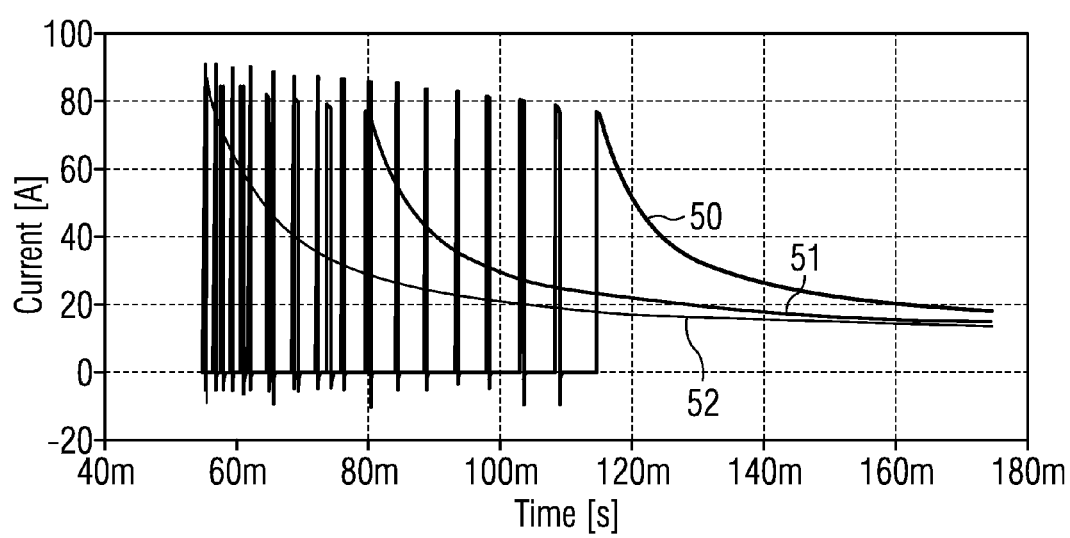
FIG. 5 is a diagram illustrating a behavior of some power switch devices.

FIG. 5 illustrates an example for a behavior when a power switch device as discussed above is used for switching on a cold light bulb.

FIG. 5 shows examples for switching on a cold light bulb via a power switch for three different supply voltages. In FIG. 5, the current is plotted versus time. A curve 52 shows the behavior for a relatively low voltage, in which case in an example no emergency shutdown is performed, as a current is below a shutdown limit. A curve 51 shows the behavior for a somewhat higher voltage, where the current (for example due to the higher voltage) exceeds a shutdown limit, which in the present case may be about 80 A, leading to an emergency shutdown. In the example shown, seven repetitions of switching on are needed until a steady operation is reached. Curve 50 shows the behavior for an even higher voltage, where even more repetitions are needed. As can be seen for curves 51 and 50, the current for each repetition slowly decreases compared to the previous try, which is for example due to a filament of a light bulb gradually warming up and thus increasing its resistance, which in turn leads to a lower current.

Figure 6:
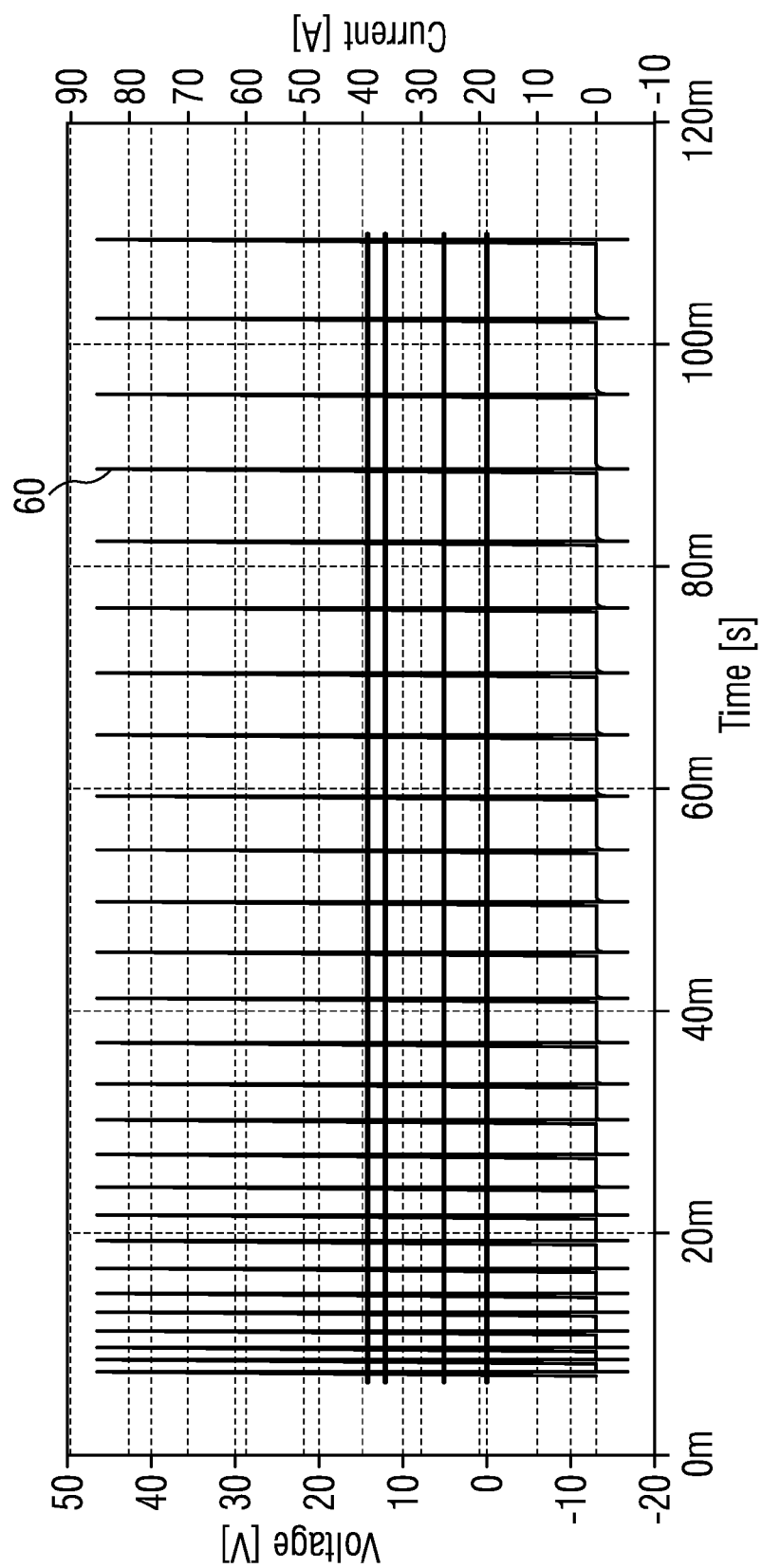
FIG. 6 is a diagram illustrating a behavior of some power switch devices.

In FIG. 6, a curve 60 shows an example behavior in case of a real short circuit. In such a case, many repetitions may be performed, unless a power switch device used has a repetition limit (for example 8 repetitions, 10 repetitions etc.) built in, after which in conventional cases for example a controlling microcontroller like microcontroller 40 of FIG. 4 will stop any further retries and leaves the power switch device permanently open, for example until a reset is applied externally after repair of a short circuited connection. In embodiments, microcontroller 40 may apply first and second retry schemes followed by disabling the power switch e.g. as discussed above. It should be noted that an overload condition where a switch is applied may be detected by various different measures in embodiment. For example, a temperature of a power switch may be monitored (for example using temperature sensor 31, 32 of FIG. 3 or temperature sensor 412 of FIG. 4). When a temperature limit, for example of the order between 150° C. and 200° C., is exceeded, the power switch may be opened. In other embodiments, a temperature rise may be taken as a criteria, for example a temperature rise exceeding a certain threshold. For example, such a threshold may be between 60 and 100 K, for example about 80 K. In other cases, additionally or alternatively and as already mentioned, a current limit may be used, for example between 60 and 100 A, for example about 80 A. Additionally or alternatively, a voltage drop across a switch use for example a drain-source voltage in case a field effect transistor is used as a switch, may be used. In some embodiments, the voltage may only be monitored after a transition phase after turning on and/or after a blanking time. Depending on a technology used, a voltage threshold may for example be of the order of 2 Volts. The above criteria may be combined. For example, a shutdown may be performed, i.e. an opening of a switch, when more than one of the above-mentioned criteria is met. In other embodiments, only one or some of the above criteria may be used.

Figure 7:
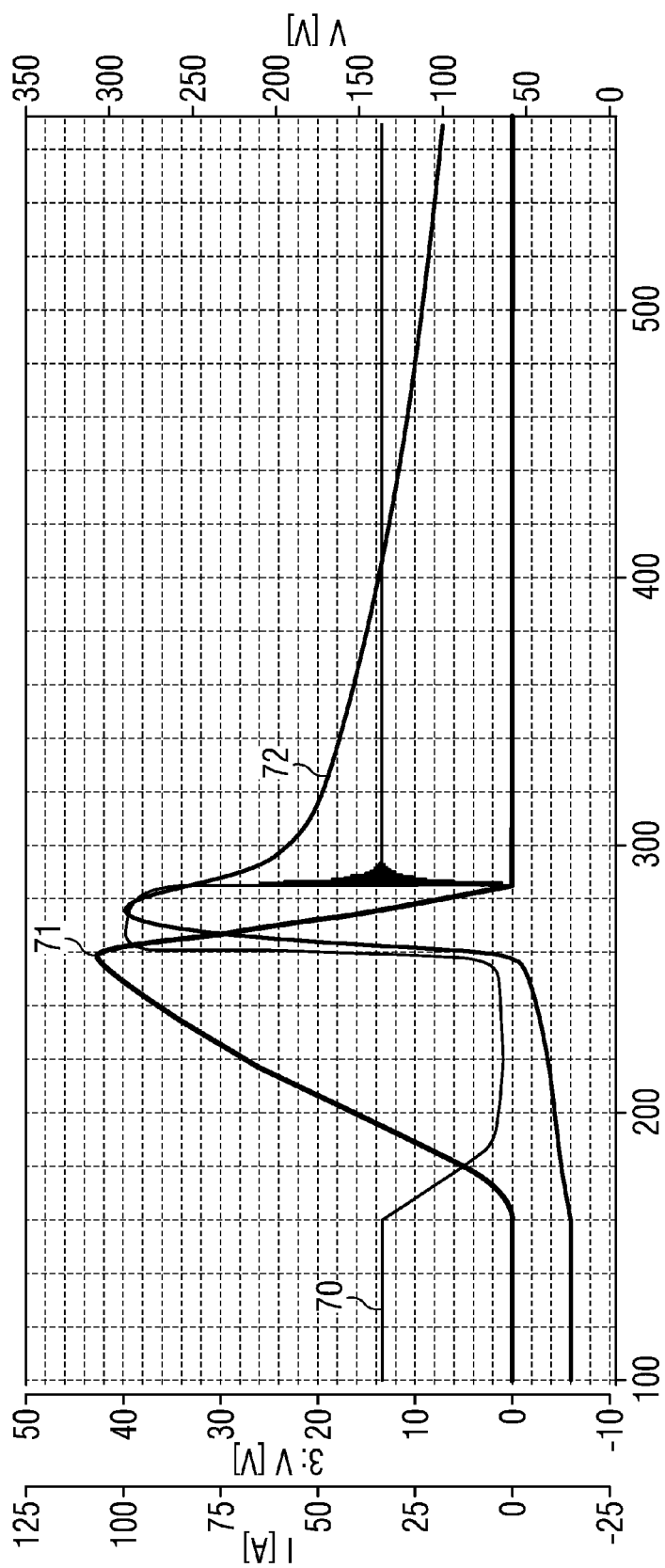
FIG. 7 and FIG. 8 are diagrams illustrating the behavior of some power switch devices during shutdowns.

To illustrate the behavior of various parameters during an overload event, which leads to an emergency shutdown, i.e. opening of a power switch, together with a discharge of energy stored for example in inductivities e.g. of wiring, FIG. 7 illustrates the behaviors of current, temperature and voltage during such an event. A curve 71 illustrates a load current. At a current of a little bit of over 100 A, an opening of the switch is initiated. A curve 70 illustrates a drain-source voltage over a power switch during the event. Finally, a curve 72 illustrates the temperature of the power switch. As can be seen, due to a discharge (e.g. from inductivities) clamping following the opening of the power switch, the temperature rises significantly. The temperature scale is illustrated on the right of FIG. 7 in walls, by applying a voltage equivalent.

Figure 8:
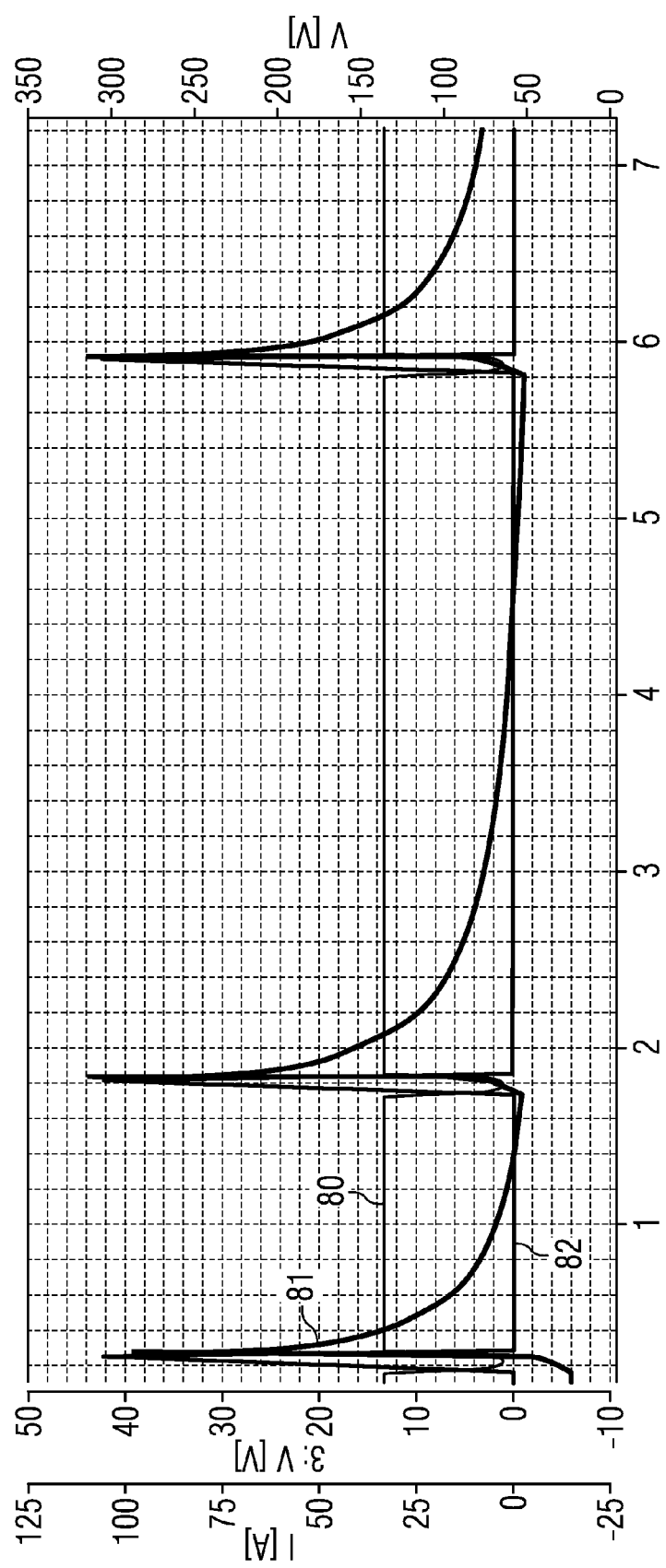

FIG. 8 shows a similar graph as FIG. 7 for three repetitive events. A curve 80 illustrates a drain-source voltage, a curve 81 illustrates a temperature and a curve 82 illustrates a load current. As mentioned, a number of repetitions in some embodiments may be based on first and second retry schemes.

Next, with reference to FIGS. 9 to 13, Some examples for first and second retry schemes as mentioned above will be discussed. FIGS. 9 to 13 serve only as examples to illustrate some techniques used herein further, and are not to be construed as limiting. For illustration purposes, the terminals and signals illustrated with respect to FIG. 4B will be used, although application of techniques disclosed herein is not limited to the power switch illustrated in FIG. 4B. Specific signal wave forms shown in FIGS. 9-13 serve merely illustration purposes and may vary depending e.g. on a particular implementation or application.

Figure 9:
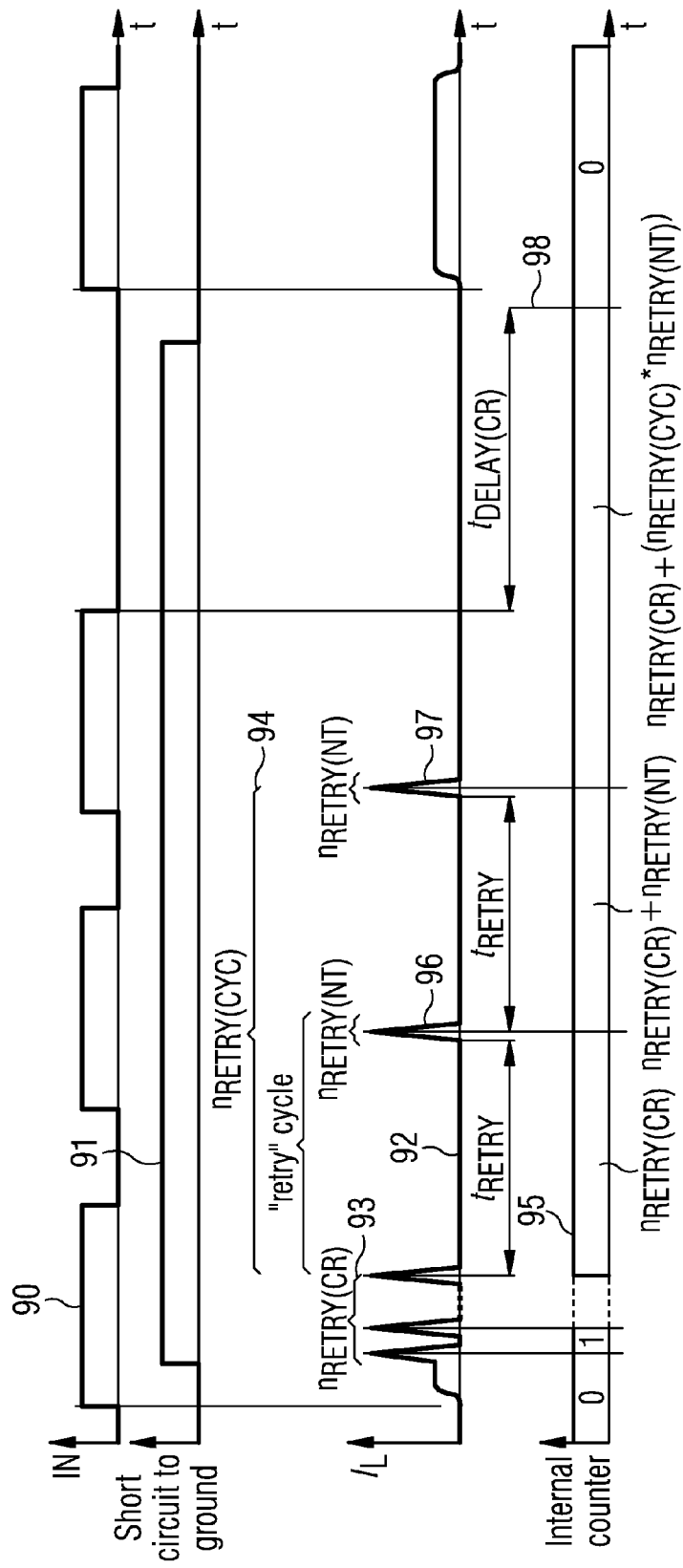
FIGS. 9 to 13 illustrate various example signals of some embodiments.

A curve 90 illustrated in FIG. 9 illustrates an example control signal at an input terminal IN attempting to alternately close and open a power switch. For example, when signal 90 is high, the power switch is to be closed, and when signal 90 is low, the power switch is to be opened.

A curve 91 illustrates when in the example of FIG. 9 a short circuit to ground appears. In the example of FIG. 9, a high value of curve 91 indicates presence of a short circuit. In particular, the short circuit to ground in the example of FIG. 9 appears shortly after first closing the switch. Again, this serves merely as an example. A curve 92 in FIG. 9 illustrates a load current $I_L$ (see e.g. FIG. 4B). Peaks in curve 92 illustrate individual retries, when the power switch is closed and then opened again due to an overload condition, for example due to overcurrent or overheating.

In the embodiment of FIG. 9, a first retry scheme 93 comprises $n_{RETRY(CR)}$ retries, i.e. the power switch is repeatedly closed again (and then opened again as in the shown example the short circuit condition remains) $n_{RETRY(CR)}$, times. During this first retry scheme, for example the power switch is closed again if the power switch device is in a stable condition, with no overtemperature, delta overtemperature or overcurrent as explained above present. In the bottommost line of FIG. 9, an internal counter 95 is shown, which increases with each retry. After a number of retries $n_{RETRY(CR)}$ has been reached, in the embodiment shown the power switch device is switched off, i.e. opened. Then, a second retry phase 94 follows for up to $n_{RETRY(CR)}$) cycles. During the second retry scheme, e.g. when the power switch device is to be switched on (closed) again based on signal 90, a time $t_{RETRY}$ after the last retry one or more (up to $n_{RETRY(NT)}$ further retries (for example 96, 97) is/are performed, i.e. the power switch is closed again. As the short circuit is still present (curve 91), again an overload condition occurs, followed by opening the device again. In the second retry scheme 94, a next retry or group of $n_{RETRY(NT)}$ retries only occurs after again a time $t_{RETRY}$ has passed. The time interval $t_{RETRY}$ may be larger than time intervals between the individual retries in first retry scheme 93, as illustrated in FIG. 9, for example at least two times larger, at least five times larger or at least ten times larger. In some embodiments, $t_{RETRY}$ may be of the order of 50 ms, but not limited thereto. In some embodiments, the first retry scheme may be regarded e.g. as temperature-based, as a next retry may occur when no overtemperature situation or other temperature-based overload is detected. In contrast thereto, second retry scheme 94 may be regarded as time-base as further retries are allowed only after a certain time $t_{RETRY}$.

As mentioned, while a single retry 96 and a single retry 97 are shown in FIG. 9, these retries may actually comprise a plurality of retries, for example a number $n_{RETRY(NT)}$ performed consecutively, for example based on thermal considerations. The number $n_{RETRY(NT)}$ may be different from the number $n_{RETRY(CR)}$, but may also be the same.

After a maximum number of $n_{RETRY(CYC)}$ of such retries 96, 97, the second retry scheme ends. In some embodiments, $n_{RETRY(CYC)}$ may be between one and 10, but is not limited thereto. As in the example of FIG. 9 the short circuit still persists the power switch is disabled, for example by latching the power switch to an off-state. Before being able to switch the power switch on again, a reset has to be applied. Such a reset may be defined in various ways. For example, in the example of FIG. 9, a reset may be applied by keeping signal 90 at a low state for at least a predetermined time $t_{DELAY(CR)}$.

After this time $t_{DELAY(CR)}$, in the example of FIG. 9 at 98, the counter illustrated by 95 is reset to a predetermined value, for example to zero, such that the first and/or second retry schemes may be applied again. In the example shown, at time 98 the short circuit (91) has ended, for example due to a repair or other circumstances, and the power switch switches normally, with a lower load current $I_L$ as during the retries illustrated in FIG. 9. It should be noted that the first and/or second retry schemes in embodiments are also ended when no overload condition occurs on a retry.

In some embodiments, it may be possible to force a reset of a counter like counter 95 by other means than waiting the delay time $t_{DELAY(CR)}$. An example is illustrated in FIG. 10.

Figure 10:
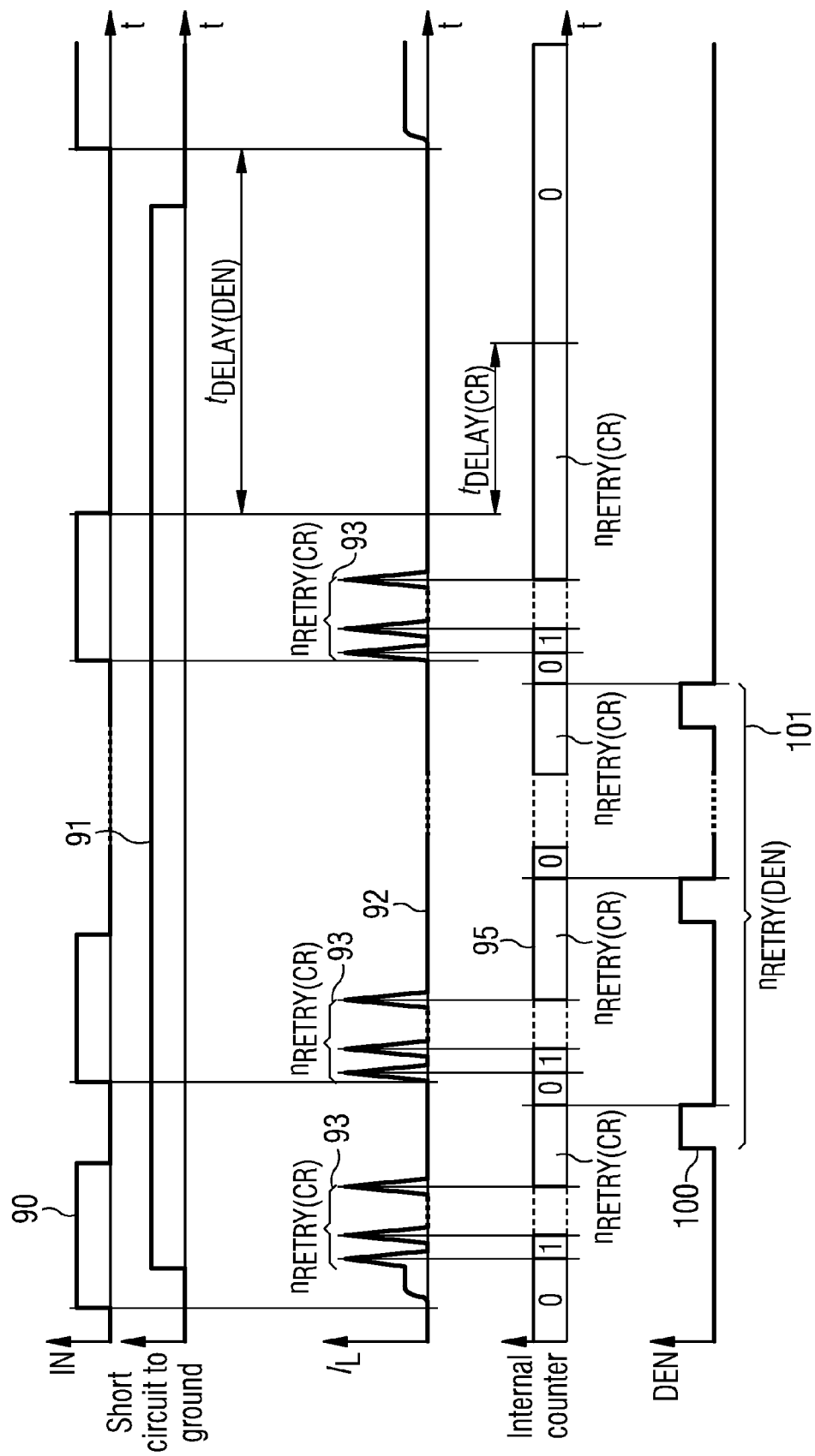

Similar to FIG. 9, FIG. 10 illustrates example signals referring to the power switch device of FIG. 4B for illustration purposes. Signals and elements essentially corresponding to signals or elements of FIG. 9 bear the same reference numerals to avoid repetitions and will not be described again in greater detail.

In the example of FIG. 10, besides waiting the delay time $t_{DELAY(CR)}$, the counter 95 may also be reset by applying a high-low signal 100 (i.e. first switching from low to high and then from high to low after holding the high state for a time duration) to the diagnosis pin DEN while signal 90 is low. The reset may then be performed essentially at the falling edge of signal 100 as illustrated. Furthermore, in embodiments a length of the "pulse" in signal 100 has to be longer than a predetermined threshold time $t_{DEN(CR)}$ to reset counter 95. In FIG. 10, as an example three such resets or, more general, $n_{RETRY(DEN)}$, of such resets (during 101) are shown. As the counter is reset, in the example of FIG. 10 with each high phase (indicating a desired closing of the power switch) of signal 90 first retry scheme 93 is applied. It should be noted that in some implementations of power switches, in normal operations signals 90 and 100 are switched simultaneously between high and low, such that in normal operation the situation where signal 100 is high and signal 90 is low does not appear. Therefore, such a combination of high and low signals as shown in some embodiments may be used for resetting the counter.

It should be noted that some power switches may have more than one input and more than one output. In this case, an output for which the counter should be reset (e.g. the output is de-latched) may be selected by applying an input to a specific pin (sometimes labelled DSEL) while the pulse 100 is applied, i.e. while signal 100 toggles twice (rising edge followed by falling edge).

The above possibilities for reset (input signal 90 needing to be low longer than a predetermined time or by applying pulses to a specific pin like DEN) are merely examples, and other reset strategies may be used as well, for example applying specific signals or signal sequences to other pins or providing a dedicated reset pin. As mentioned, if in normal operation the DEN and the IN terminals are driven with the same signal, with the reset strategy illustrated no unwanted reset may occur in embodiments.

The above-described retry strategy may in embodiments help to address different customer requirements and strategies. For example, for loads with high inrush current requirements like some light bulbs, via the DEN pin as illustrated in FIG. 10 or any other reset strategy, the user may reset the counter if many retries are needed or required. For loads with lower inrush current requirements which do not require a complex strategy including the usage of a reset like the DEN pin, a time-based reset, for example via putting signal 90 low for the predetermined time $t_{DELAY}$ (CR) as explained above, may be used. By using the second retry scheme involving a time $t_{RETRY}$ as shown in FIG. 9, in embodiments, it is possible to check after $n_{RETRY(CR)}$ overload events if the overload is still present or if for example a typical load is present.

In some embodiments mentioned above, as explained during the second retry scheme for example a microcontroller or other entity tries to close the power switch for $n_{RETRY(NT)}$ times after a predetermined time $t_{RETRY}$ if during the first $n_{RETRY(CR)}$ times of the first retry scheme an overload was present.

Furthermore, embodiments make it possible to check in case of a short circuit during the first $n_{RETRY(CR)}$ retries after a time if the short circuit is still present.

To distinguish between these two possibilities, in embodiments a diagnosis feature may be used. For example, as soon as an overload event occurs which changes the value of an internal counter (like counter 95) from its reset state (for example zero), in embodiments a predetermined current $I_{IS(fault)}$ is provided at a terminal like the IS terminal when DEN is set to high. This predetermined current $I_{IS(fault)}$ is used to signal a fault condition for example to a microcontroller like microcontroller 40 of FIG. 4A.

Figure 11:
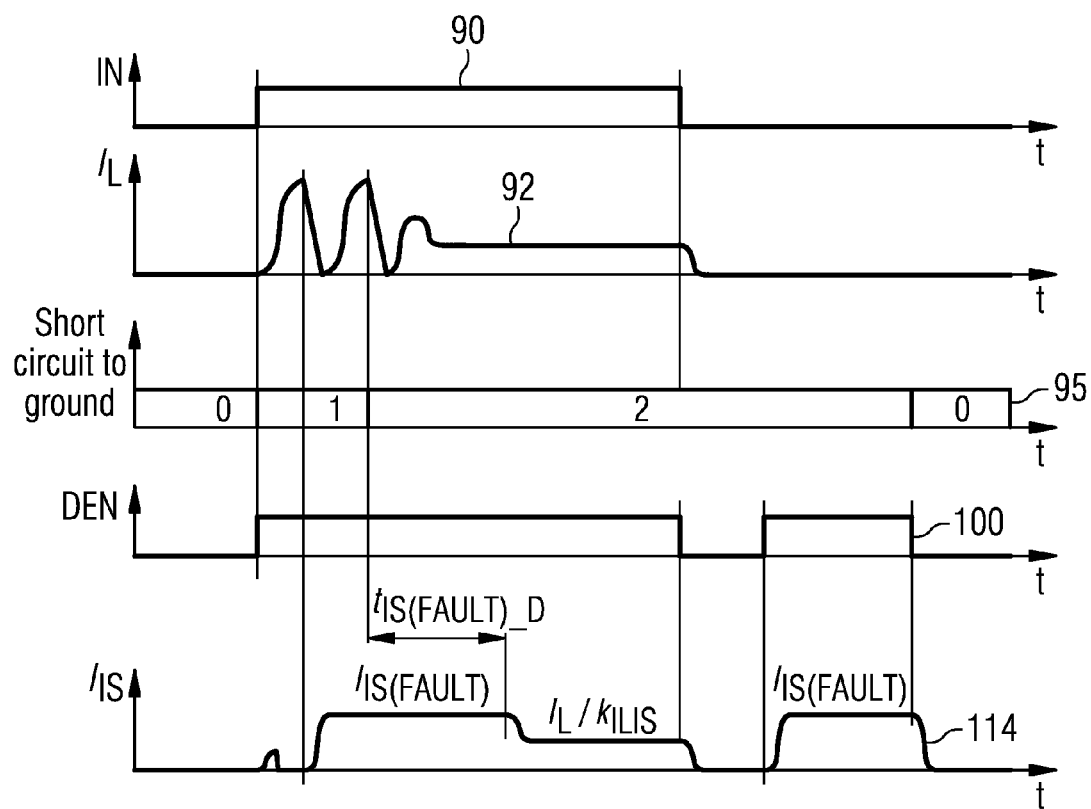

FIG. 11 illustrates a case where after two retries (seen in curve 92) the power switch is successfully closed without an overload condition occurring any longer. In the embodiment illustrated by the signals of FIG. 11, after within a certain time $t_{IS(fault)\_D}$ when DEN is high still the fault current is output. After this, a current $I_S = I_L/k_{ILIS}$ sensed for example at a current sense transistor like transistor 41 of FIG. 3 may be output to be able to measure the load current. In some embodiments, the fact that an error (e.g. overload) occurs may be stored until the counter is reset as illustrated in FIG. 11. In such embodiments, the error current may be read out again by applying a reset via DEN (DEN pin high, IN pin low) as illustrated in FIG. 11.

Figure 12:
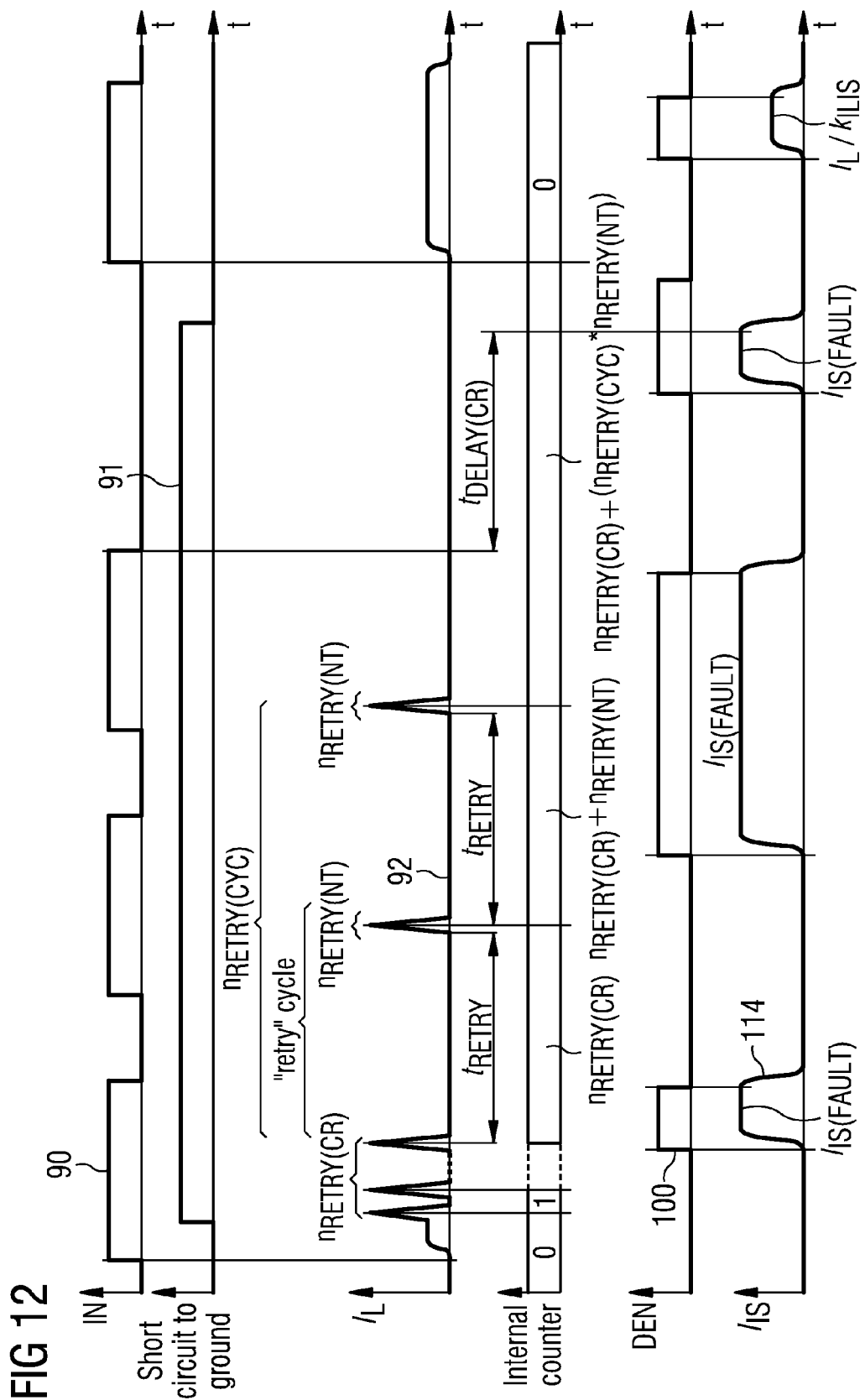

Conversely, as illustrated in FIG. 12, if an error like a short circuit persists as illustrated by curve 91, the error current $I_{IS(fault)\_D}$ may output each time a diagnosis is performed (DEN set to high) until the counter is reset (in the example of FIG. 12 by keeping IN low for the predetermined time $t_{DELAY(CR)}$).

Figure 13:
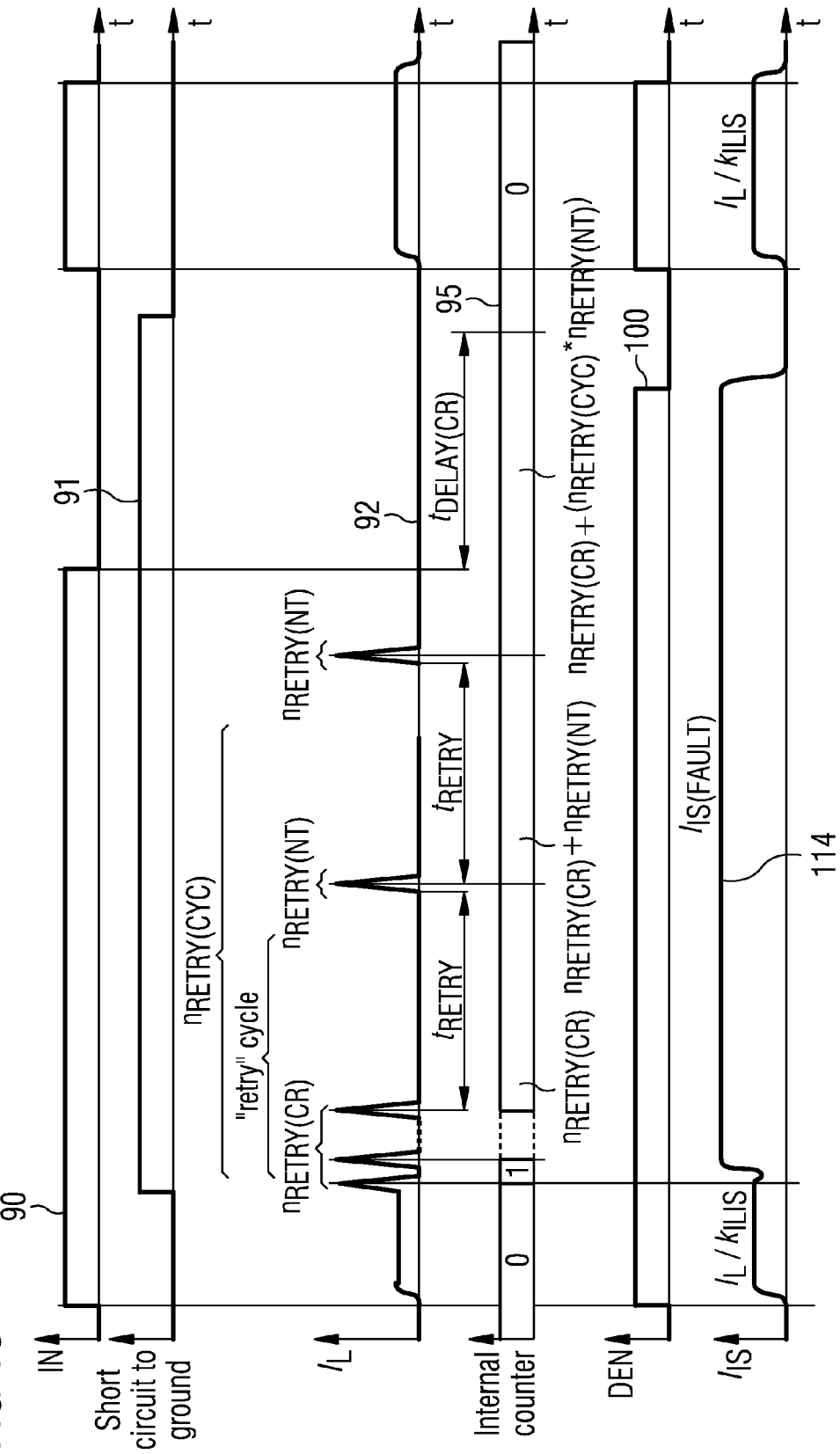

FIG. 13 illustrates example signals similar to the case of FIG. 12. In case of FIG. 13, the DEN signal 100 is set to high for a longer time than signal 90 at pin IN.

As soon as the short circuit condition occurs, as seen from curve 114, the current $I_{IS}$ is set to the fault value. After the reset time $t_{DELAY(CR)}$, when DEN signal 100 is set high again, the value $I_L/k_{ILIS}$ is output as current $I_{IS}$.

Figure 14B:
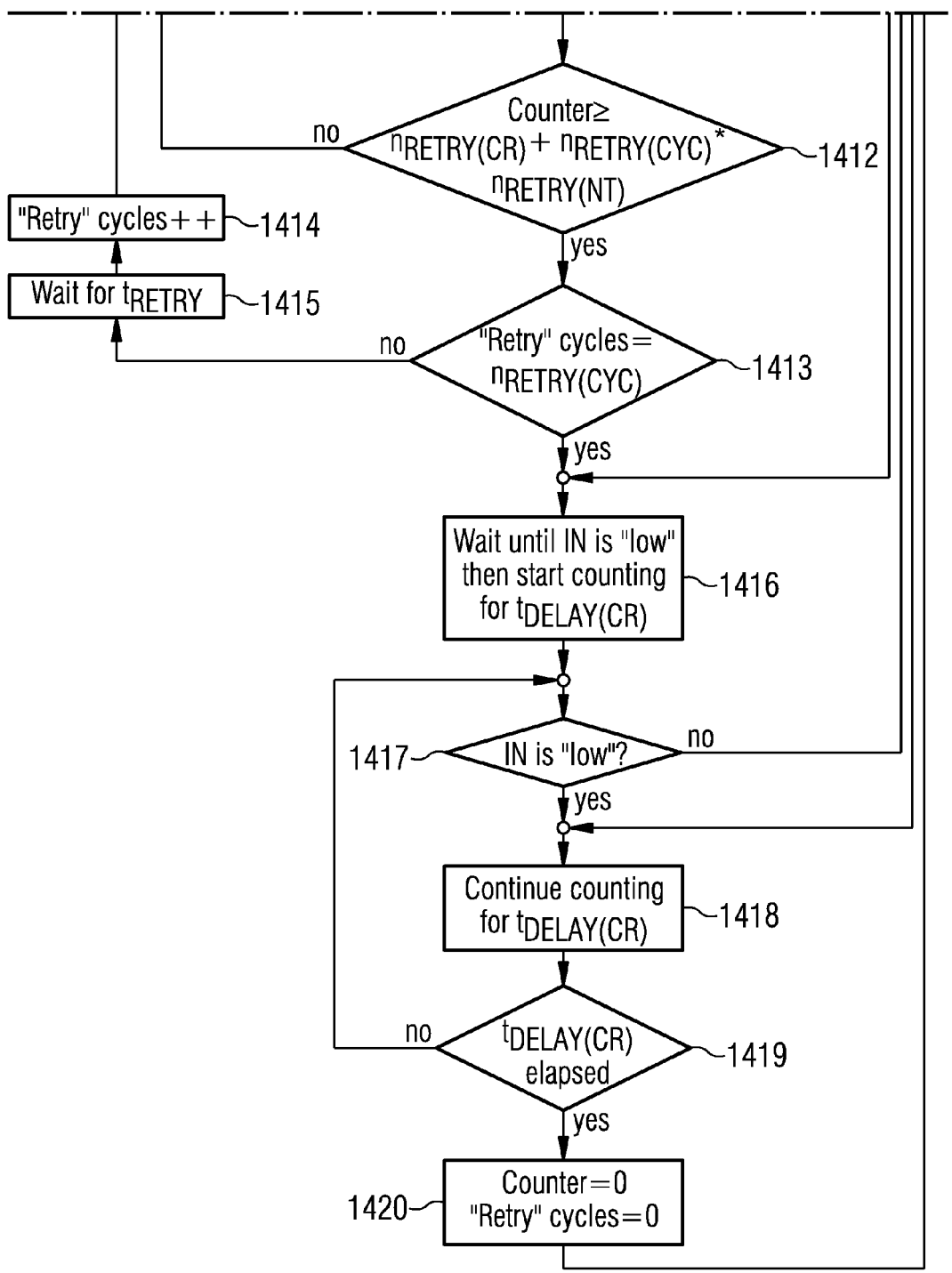
FIG. 14 is a flow chart illustrating a method according to an embodiment, and FIG. 14 refers collectively to both FIG. 14A and FIG. 14B.

FIG. 14 illustrates a method according to an embodiment. The method of FIG. 14 illustrates one possibility to implement the first and second retry schemes as illustrated above. The method of FIG. 14 may for example be implemented in software, hardware, firmware or combinations thereof. In some embodiments, the method may be implemented in a microcontroller controlling a power switch, like microcontroller 40 of FIG. 4A, or in an internal controller or logic of the switch, but is not limited thereto.

While the method of FIG. 14 is represented as a series of acts or events, this is not to be construed as limiting, and in other embodiments some of the acts or events may be performed in a different order than shown, and/or some acts or events may be performed parallel with each other. While for explanatory purposes, references may be made to previous figures and embodiments, application of the method of FIG. 14 is not limited to these embodiments. For example, in the description of FIG. 14 for explanatory purposes reference may be made to specific input pins (like pin IN), the method may also apply to other switch devices where a terminal for switching the power on and off as a different label.

The method of FIG. 14 starts at 140. At 141, the method checks if a control signal for closing and opening the switch, for example at pin IN, is high. If this is not the case (NO at 141), at 142 the power switch (for example channel of a MOSFET) remains switched off, i.e. the switch remains open.

If the signal at pin IN is high (YES at 141), at 141 the method checks if a number of retry (cycles) has reached a threshold value $n_{RETRY(CYC)}$. If this is not the case, at 141 the switch is switched on, i.e. closed.

At 147, the method checks if some overload condition (fault condition) occurs, like overtemperature or overload (overcurrent). As long as this is not the case (NO at 147), at 146 the switch remains switched on, as long as, at 145, the input signal at pin IN is high. As long as the input signal is high and no overload condition occurs, 147, 146 and 145 are repeated. In case the input signal at pin IN becomes low (NO at 145), the switch is switched off (opened) at 144, and the method essentially starts again.

In case a fault is detected at 147 (YES at 147), at 148 the switch is switched off (opened) and at 149 a counter is increased by one (for example counter 95 illustrated previously).

At 1411, the method checks if all restart conditions are fulfilled. Restart conditions may for example include the temperature of the power switch and/or a temperature slope (delta temperature) being below a predetermined temperature threshold, and/or a current being below a predetermined current threshold. As long as the restart conditions are not fulfilled (NO at 1411), the switch remains switched off at 1410, and the method jumps back to 1411. At 1412, the method checks if the counter exceeds a value $n_{RETRY(CR)}$ (number of retries during the first retry scheme) plus $n_{RETRY(CYC)}$ times $n_{RETRY(NT)}$ (total number of retries of the second retry scheme). If this is not the case, the method jumps back to the start. At 1412, at the beginning, $n_{RETRY(CYC)}$ is zero, therefore at 1412 the method checks if the counter has reached $n_{RETRY(CR)}$, thus implementing the first retry scheme. Later, during the second retry scheme, at 1412 the method checks if a number of retries $n_{RETRY(NT)}$ for the current retry cycle has been reached, thus implementing a second retry scheme. If this is the case, at 1413 the method checks if a number of retry cycles has reached $n_{RETRY(CR)}$, each cycle corresponding to waiting a time $t_{RETRY}$ before applying $n_{RETRY(NT)}$ retries. If this is not the case, at 1415, the method waits for a time $t_{RETRY}$, and at 1414 increases the counter for the retry cycles before starting the method again. If the number of retry cycles is equal to $n_{RETRY(CYC)}$ (YES at 1413), this indicates that the second retry scheme has ended. In this case, at 1416, the methods waits until the signal at pin IN is low and then starts counting for a time duration $t_{DELAY(CR)}$ (the previously discussed reset time). During this counting, as long as IN remains low (YES at 1417), at 1418 the method continues counting until $t_{DELAY(CR)}$ is reached. When this is the case (YES at 1419), the counters are reset at 1420, and the method starts again. In case IN becomes high during counting (NO at 1417), the method jumps back to 1416 and starts counting again.

Figure 15:
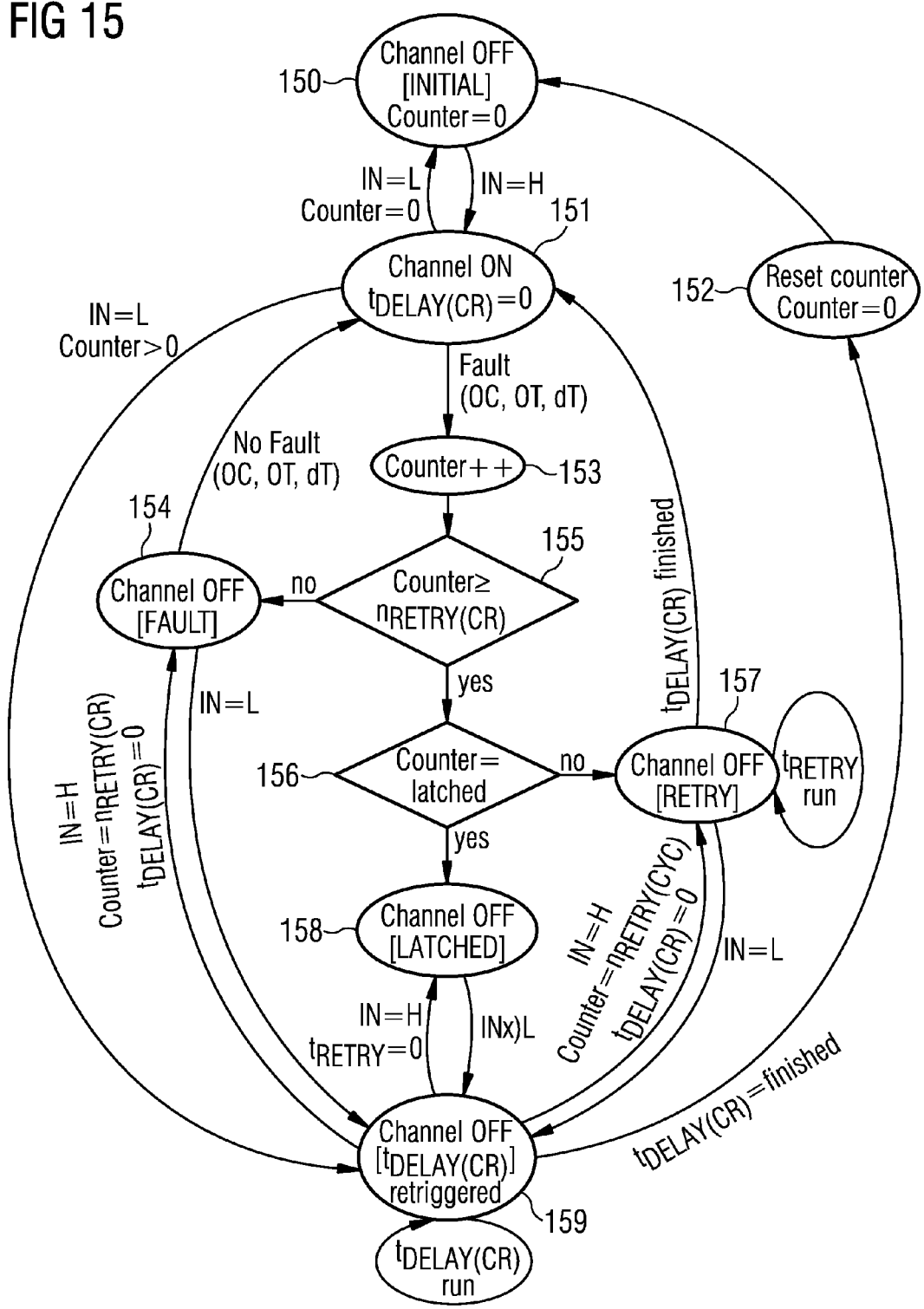
FIG. 15 illustrates a state machine according to an embodiment.

The method illustrated in FIG. 14 or also other methods and embodiments may be implemented using a state machine. An example for a state machine according to an embodiment, which may for example be implemented in a microcontroller or other control entity controlling a power switch, is illustrated in FIG. 15. The state machine of FIG. 15 may be described referring to previous embodiments for illustration purposes. However, application of the state machine of FIG. 15 is not limited to these previously described embodiments.

In an initial state at 150, the switch (for example channel of a power MOSFET) is turned off, i.e. the switch is open, and a counter is at zero. When an input signal, for example at a pin IN, is high, the state machine transitions to a state 151 where the switch is closed (for example channel of a MOSFET turned on). When the input signal becomes low again, the state machine transitions back to state 150. In state 151, furthermore a time variable $t_{DELAY}$ (CR) is set to zero.

When a fault occurs, for example an overcurrent, an overtemperature or a rapid rise in temperature above a threshold (delta temperature), the state machine transitions to state 153 where the counter is increased by one. After this, the state machine transitions to a state 155 where it is checked if the counter has reached a value $n_{RETRY(CR)}$. If this is not the case, the state machine transitions to 154 where the power switch is opened (switched off) due to the fault causing the transition from 151 to 153, and as soon as no fault is detected any longer (for example no overcurrent, no overtemperature or no delta temperature), the state machine transitions back to 151 for a retry.

In case the counter has reached the value $n_{RETRY(CR)}$, the state machine transitions from 155 to 156, where it is checked if the counter has reached a maximum value indicating that the power switch is to be disabled (e.g. latched, e.g. after a maximum number of retry cycles has been reached). In case this is not the case, the state machine transitions to state 157, which is a wait state for a time $t_{RETRY}$, after which the state machine transitions to 151. Then, the retry scheme for $n_{RETRY(CR)}$ is applied again after the delay time $t_{RETRY}$. Therefore, in the example of FIG. 15, $n_{RETRY(CR)}$ is equal to $n_{RETRY(NT)}$. Otherwise, after the first transition to 150, $n_{RETRY(CR)}$ in state 155 would have to be replaced by $n_{RETRY(NT)}$. In other words, in the example of FIG. 15, the second retry schemes comprises applying the first retry scheme in time intervals of $t_{RETRY}$.

In case in state 156 it is determined that the maximum number of retries has been reached, the state machine transitions to state 158, where the power switch device is disabled, for example the channel is latched to an off-state.

From state 158, when the channel is turned off (for example signal at pin IN set too low), the state machine transitions to state 159, where a "wait" for the time $t_{DELAY(CR)}$ serving as a reset time is performed. When during this wait time the input signal is set to high again, the system transitions back to state 158, and the time $t_{DELAY(CR)}$ is reset to zero. When the time $t_{DELAY(CR)}$ is reached without leaving state 159, and the input signal is high again, the state machine transitions to state 154, and, when no fault is present, further to state 151 to close the switch again.

When from state 159 a total number of retries has not been reached, the state machine transitions to state 157, resetting the time $t_{DELAY}$.

Furthermore, when the time delay is finished, the state machine resets the counter at 152 and transitions back to state 150.

When in state 157 the input signal changes to low, the system likewise transitions to state 159. When from state 159 the input signal changes to high and the counter indicates a number smaller than the total number of retries, the system transitions to state 157.

Figure 16:
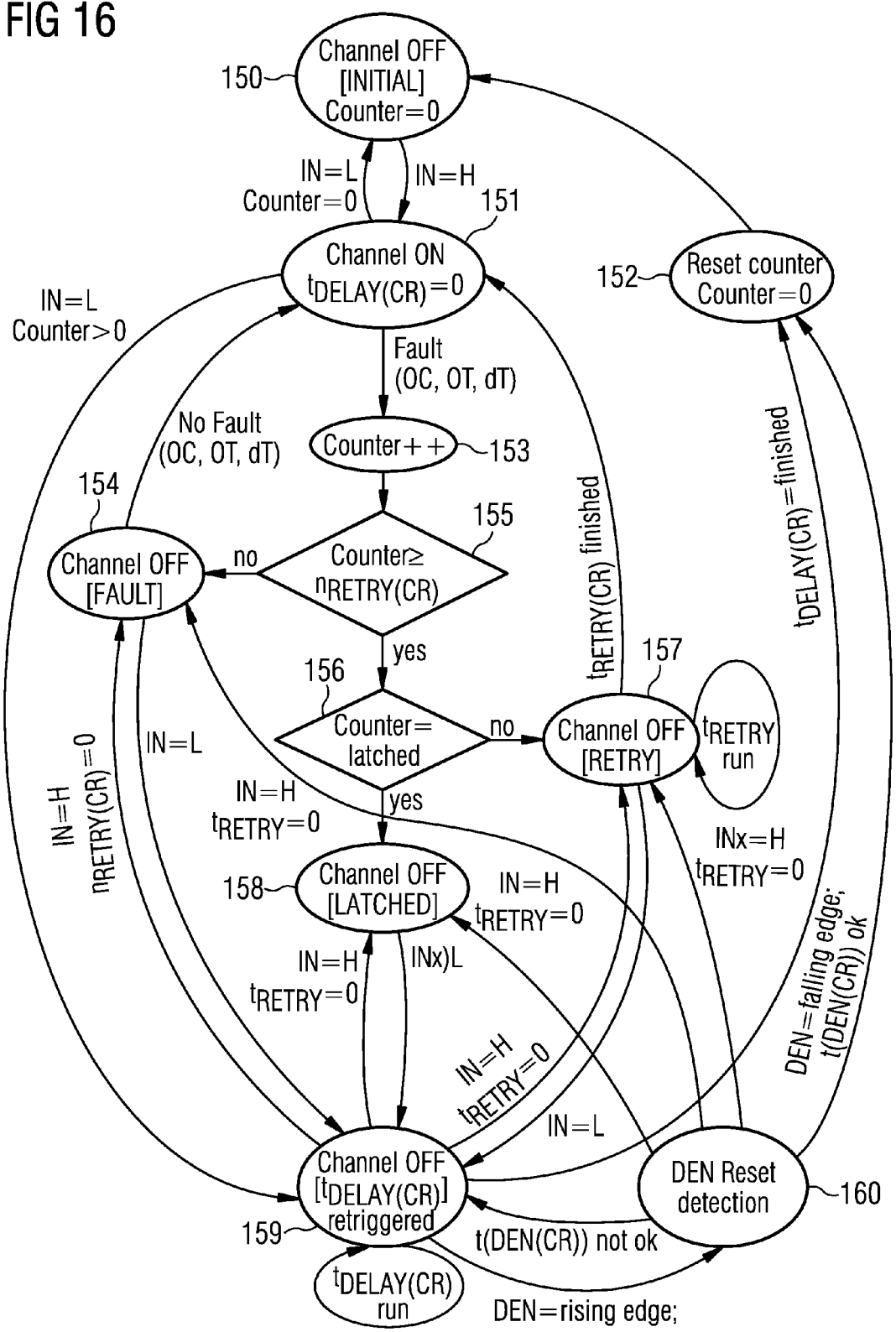
FIG. 16 illustrates a state machine according to another embodiment.

In the state machine illustrated in FIG. 15, only a reset mechanism by keeping an input signal low for a time $t_{DELAY(CR)}$ is implemented. FIG. 16 illustrates a further embodiment of a state machine which additionally implements a reset via a diagnosis enable pin (DEN) as already explained for example with reference to FIG. 10.

The embodiment of FIG. 16 apart from an additional state 160 and associated transitions corresponds to the embodiment of FIG. 15, and corresponding states bear the same reference numerals and will not be discussed again.

When in the embodiment of FIG. 16 in state 159 a rising edge at an input DEN is detected, the system transitions to state 160. State 160 is left again when the input signal IN is high. The transitions then in this case correspond to the transitions from state 159, i.e. either to state 158, to state 154 or to state 157. When a minimum time t(DEN(CR)) is not okay, i.e. the signal at DEN is not maintained for a predetermined time, the system transitions back to state 159. When in state 160, a falling edge is detected at pin DEN and the time duration t (DEN(CR)) is reached, the system transitions to state 152 resetting the counter.

Figure 17:
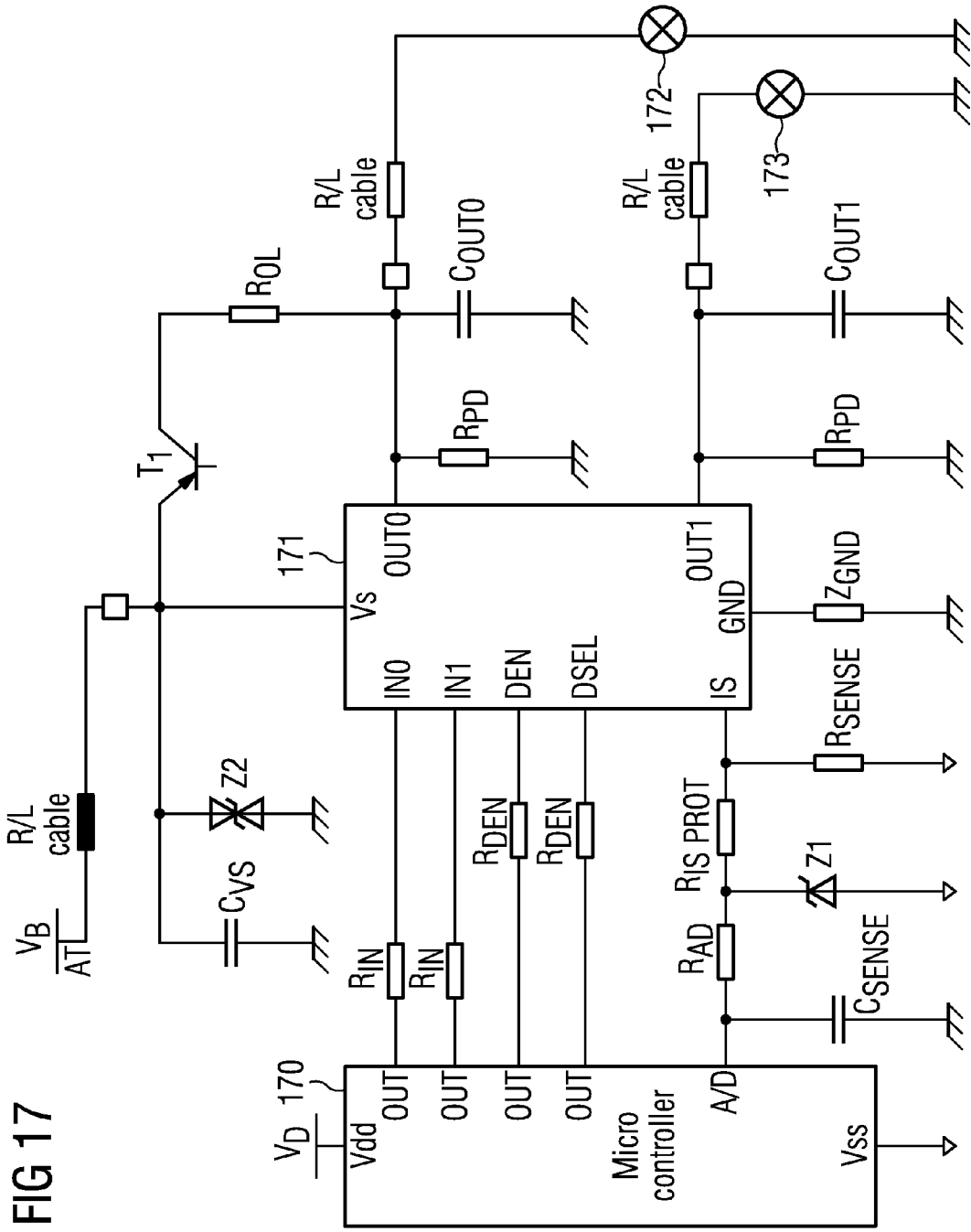
FIG. 17 is a diagram illustrating a power switch device according to some embodiments.

In the previously described embodiments, power switches having a single channel have been illustrated, i.e. power switches usable to switch a single load. In other embodiments, power switches having more than one channel may be used. An example for such a power switch device is illustrated in FIG. 17. The power switch device of FIG. 17 comprises a power switch 171, which may be similar to power switch 42 illustrated with respect to FIG. 4A with the exception that two output channels OUT0, OUT1 for selectively coupling two loads 172, 173 to a positive supply voltage are illustrated. Various resistors and capacitors may be provided as illustrated. Furthermore, Zener clamps Z1, Z2 are provided in the example of FIG. 17. The resistors, capacitances and also transistor $T_1$ shown in FIG. 17 serve merely as an example, and other elements may also be used. Some of the resistances, like R/L cable illustrated in FIG. 17, may represent resistances or inductivities coupling power switch 171 with loads 172, 173 and with positive supply voltage $V_B$.

Figure 18:
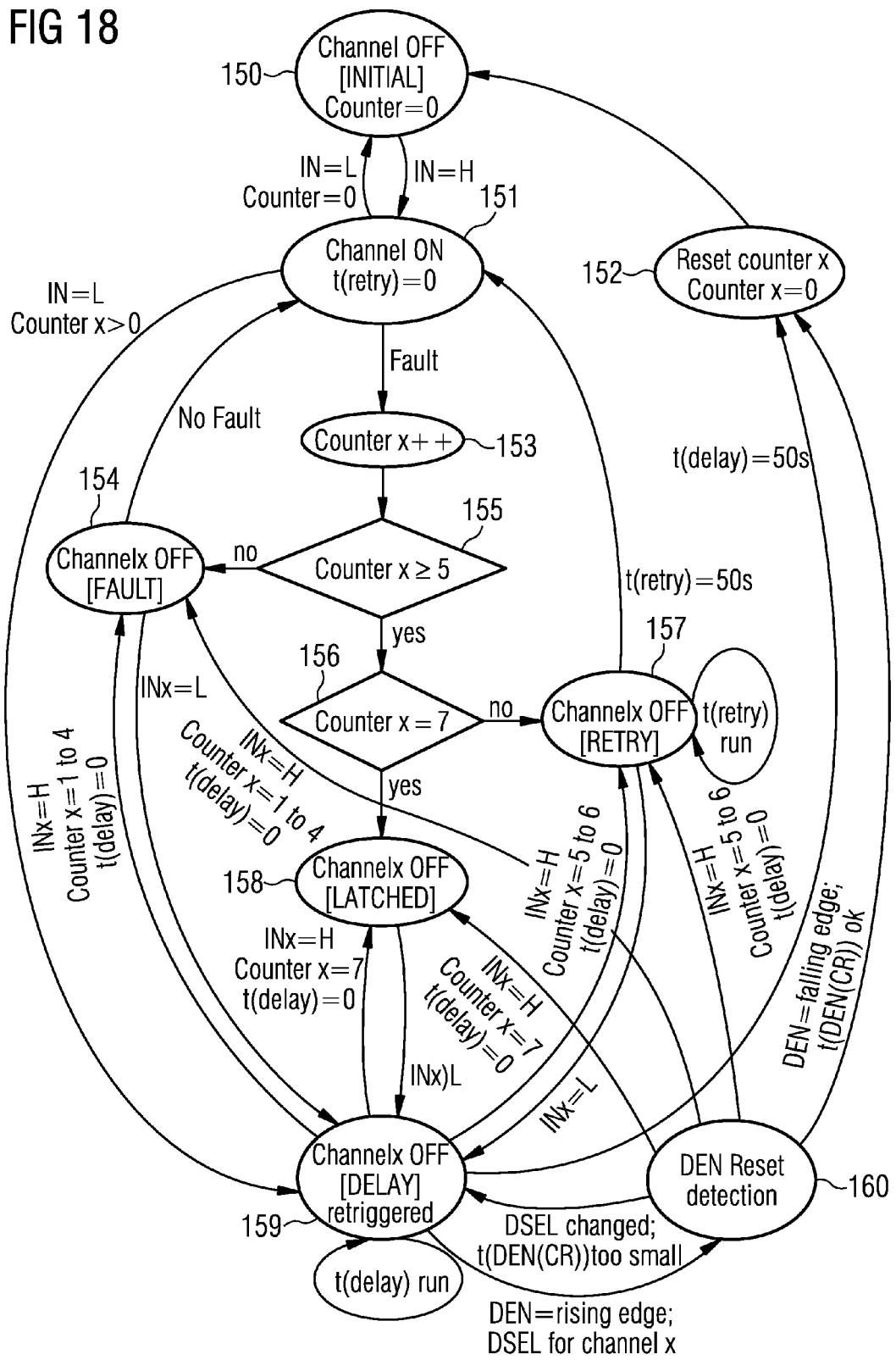
FIG. 18 shows a state diagram according to an embodiment having more than one channel.

The power switch device 171 is controlled by a microcontroller 170 which may essentially correspond to microcontroller 40 of FIG. 4A with the exception that is has more output channels. Likewise, power switch 171 has two input terminals IN0, IN1 to separately control the switching on and off of the two loads 172, 173, and a pin DSEL where a diagnosis (enabled by pin DEN) may be selected between the two channels. Generally, all techniques and embodiments described before may also be applicable to such a power switch device with two channels (or more than two channels). A reset mechanism using the DEN pin in such embodiments may additionally use the DSEL pin to select the channel to be reset. To illustrate this, a corresponding state diagram is shown in FIG. 18. The state diagram of FIG. 18 largely corresponds to the state diagram of FIG. 16, and corresponding elements bear the same reference numerals.

In contrast to FIG. 16, in FIG. 18 for illustration purposes some numerical values are given for the various threshold values of the counters. Furthermore, a plurality of x counters and input pins are used (two when applied to FIG. 17), and an index x (x=0 for IN0, OUT0 for x=1 for IN1, OUT1 of FIG. 17, for example) denotes the number of the channel considered. Otherwise, the embodiment of FIG. 18 corresponds to the embodiment of FIG. 16. In other embodiments, the DEN reset may omitted and in this case, an embodiment similar to FIG. 15 may be implemented in a two-channel power switch. It should be noted that the numerical values for the counter thresholds (for example 1 to 4, 5, 7 etc.) given in FIG. 18 serve only illustration purposes and may differ in other embodiments. In some embodiments, the threshold may be user-configurable.

The above-described embodiments serve only as examples, and are not to be construed as limiting. While for example the state machines illustrated show specific implementation possibilities for techniques disclosed herein, in other embodiments other implementations may be possible. For example, in some embodiments the order of the first and second retry schemes as illustrated and described above may be reversed. In other words, in some embodiments a first retry scheme may be implemented as explained for the second retry scheme above, and a second retry scheme following the first retry scheme may be implemented as explained for the first retry scheme above.

What is claimed is:

1. A device, comprising:
   a switch,
   an overload detection circuit coupled with the switch, and
   a controller, the controller being configured to, when an overload state is detected by the overload detection circuit when the switch is to be closed, to open the switch,
   wherein, upon detection of the overload, the controller is further configured to repeatedly retry closing the switch according to a first retry scheme,
   if an overload condition remains at an end of the first retry scheme, to repeatedly retry closing the switch according to at least a second retry scheme different from the first retry scheme, wherein:
   the first retry scheme comprises a first maximum number of retry attempts, wherein the first maximum number is greater than one, and wherein the controller is configured to wait for a first predetermined time between each retry attempt, and
   the second retry scheme comprises:
     waiting a second predetermined time after the first retry scheme before a next closing of the switch, and
     performing a second maximum number of retry attempts, wherein the second maximum number is greater than one, and
   if an overload condition remains at an end of at least the second retry scheme, disable the switch.

2. The device of claim 1, wherein the first retry scheme comprises closing the switch again when no overload condition is detected, and opening the switch again when an overload condition occurs after closing the switch.

3. The device of claim 1, wherein the second predetermined time is longer than the first predetermined time between closings of the switch during the first retry scheme.

4. The device of claim 1, wherein the second retry scheme further comprises repeatedly closing the switch when no overload condition is detected and opening the switch when an overload condition occurs after closing the switch.

5. The device of claim 1, wherein at least some time intervals between closings of the switch in the second retry scheme are longer than the first predetermined time between closings of the switch during the first retry scheme.

6. The device of claim 1, wherein the controller is further configured to re-enable the switch after the disabling in response to a reset.

7. The device of claim 6, wherein the reset comprises at least one of a control signal controlling the switch being in a state indicating that the switch is to opened for a predetermined time or applying a logical high-low signal to a diagnosis pin while applying a logical low signal value to a control pin controlling opening and closing of the switch.

8. The device of claim 1, wherein repeatedly retrying closing the switch according to at least a second retry scheme comprises repeatedly retry closing the switch according to the second retry scheme followed by at least one further retry scheme.

9. The device of claim 1, wherein the overload condition comprises at least one of an overcurrent, an overtemperature or a temperature rise above a predetermined threshold.

10. The device of claim 1, wherein the device is adapted to output a signal indicating an error after the overload has occurred at least upon receiving a diagnosis enable signal and at least until a reset has been applied or a predetermined time after the switch has been closed without an overload occurring.

11. The device of claim 1, wherein the second retry scheme comprises a plurality of retries of the first retry scheme, wherein:
the second retry scheme comprises waiting the second predetermined time between each retry of the of the first retry scheme, wherein the second predetermined time is longer than the first predetermined time; and
the second maximum number of retry attempts equals the number of retries of the first retry scheme multiplied by the first maximum number of retry attempts in the first retry scheme.

12. A device, comprising:
a power switch transistor,
an overload detection circuit, and
a controller, wherein the controller is adapted to:
detect an overload condition and open the power switch transistor
upon opening the power switch transistor due to an overload condition, determine whether an overload condition continues to exist,
in response to determining an overload condition no longer exists, repeatedly close the power switch transistor up to a first predetermined number of times, wherein the first predetermined number of times includes a maximum predetermined number of times greater than one and wherein the controller is configured to wait for a first predetermined time between each closing of the power switch transistor, upon closing the power switch transistor up to a first predetermined number of times, determine whether the overload condition persists after the first predetermined number of times,
in response to determining an overload condition persists, waiting a second predetermined time,
closing the power switch transistor for up to a second predetermined number of times, wherein the waiting and the closing the power switch transistor for up to the second predetermined number of times is repeated a third predetermined number of times, and
disabling the power switch transistor if the overload condition persists after the third predetermined number of times.

13. A method, comprising:
opening a switch when detecting an overload condition,
repeatedly retrying to close the switch according to a first retry scheme,
if an overload condition remains at an end of the first retry scheme, repeatedly retrying to close the switch according to at least a second retry scheme different from the first retry scheme, wherein:
the first retry scheme comprises a first maximum number of retry attempts, wherein the first maximum number is greater than one, and wherein the controller is configured to wait for a first predetermined time between each retry attempt, and
the second retry scheme comprises:
waiting a second predetermined time before a next closing of the switch, and
performing a second maximum number of retry attempts, wherein the second maximum number is greater than one, and
if an overload condition remains at an end of the second retry scheme, disabling the switch.

14. The method of claim 13, wherein the first retry scheme comprises closing the switch again when no overload condition is detected, and opening the switch again when an overload condition occurs after closing the switch.

15. The method of claim 14, wherein the second predetermined time is longer than the first predetermined time between closings of the switch during the first retry scheme.

16. The method of claim 14, wherein the the second retry scheme comprises repeatedly closing the switch when no overload condition is detected and opening the switch when an overload condition occurs after closing the switch.

17. The method of claim 13, further comprising re-enabling the switch after the disabling in response to a reset.

18. The method of claim 17, wherein the reset comprises at least one of a control signal controlling the switch being in a state indicating that the switch is opened for a predetermined time or applying a logical high-low signal to a diagnosis pin while applying a logical low signal value to a control pin controlling opening and closing of the switch.

19. The method of claim 13, wherein the second retry scheme comprises a plurality of retries of the first retry scheme, wherein:
the second retry scheme comprises waiting the second predetermined time between each retry of the of the first retry scheme, wherein the second predetermined time is longer than the first predetermined time; and
the second maximum number of retry attempts equals the number of retries of the first retry scheme multiplied by the first maximum number of retry attempts in the first retry scheme.

* * * * *